United States Patent
Lieberman et al.

[15] 3,655,288
[45] Apr. 11, 1972

[54] OPTICAL SYSTEM FOR USE IN AUTOMATIC, SIMULTANEOUS MULTIELEMENT ATOMIC SPECTROSCOPY SAMPLE ANALYSIS APPARATUS

[72] Inventors: Lee M. Lieberman, Fort Lee, N.J.; Robert T. Schumann, Flushing, N.Y.

[73] Assignee: Technicon Instruments Corporation, Tarrytown, N.Y.

[22] Filed: July 30, 1970

[21] Appl. No.: 59,401

[52] U.S. Cl. ................................. 356/87, 356/85, 356/187
[51] Int. Cl. .................. G01j 3/30, G01j 3/48, G01m 21/58
[58] Field of Search ................................. 356/87, 187, 190, 85

[56] References Cited

UNITED STATES PATENTS 3,523,748  8/1970  Chisholm et al. ........................ 356/87
3,532,429  10/1970 Hughes et al. ........................... 356/87

OTHER PUBLICATIONS

" Inverse Cassegrainian Systems" ; S. Rosin; Applied Optics; Vol. 7 No. 8; Aug. 1968; pg. 1483– 1497.

Primary Examiner—Ronald L. Wibert
Assistant Examiner—V. P. McGraw
Attorney—S. P. Tedesco and Stephen E. Rockwell

[57] ABSTRACT

New and improved optical system for use in apparatus for the automatic, simultaneous multielement analysis of samples by atomic spectroscopy which include a plurality of radiation sources effective to emit radiation of different wavelengths for the irradiation of a sample burner flame are provided, and comprise radiation source optic means including a plurality of toroidal mirrors for reflecting the radiation from said plurality of radiation sources and focusing said radiation substantially at the same volume of said sample burner flame for irradiation thereof, and detector means optics, including spaced primary and secondary mirrors for observing substantially only said irradiated sample burner flame volume and focusing substantially only the radiation therefrom at the radiation detector.

5 Claims, 4 Drawing Figures

INVENTORS
LEE M. LIEBERMAN
ROBERT T. SCHUMANN

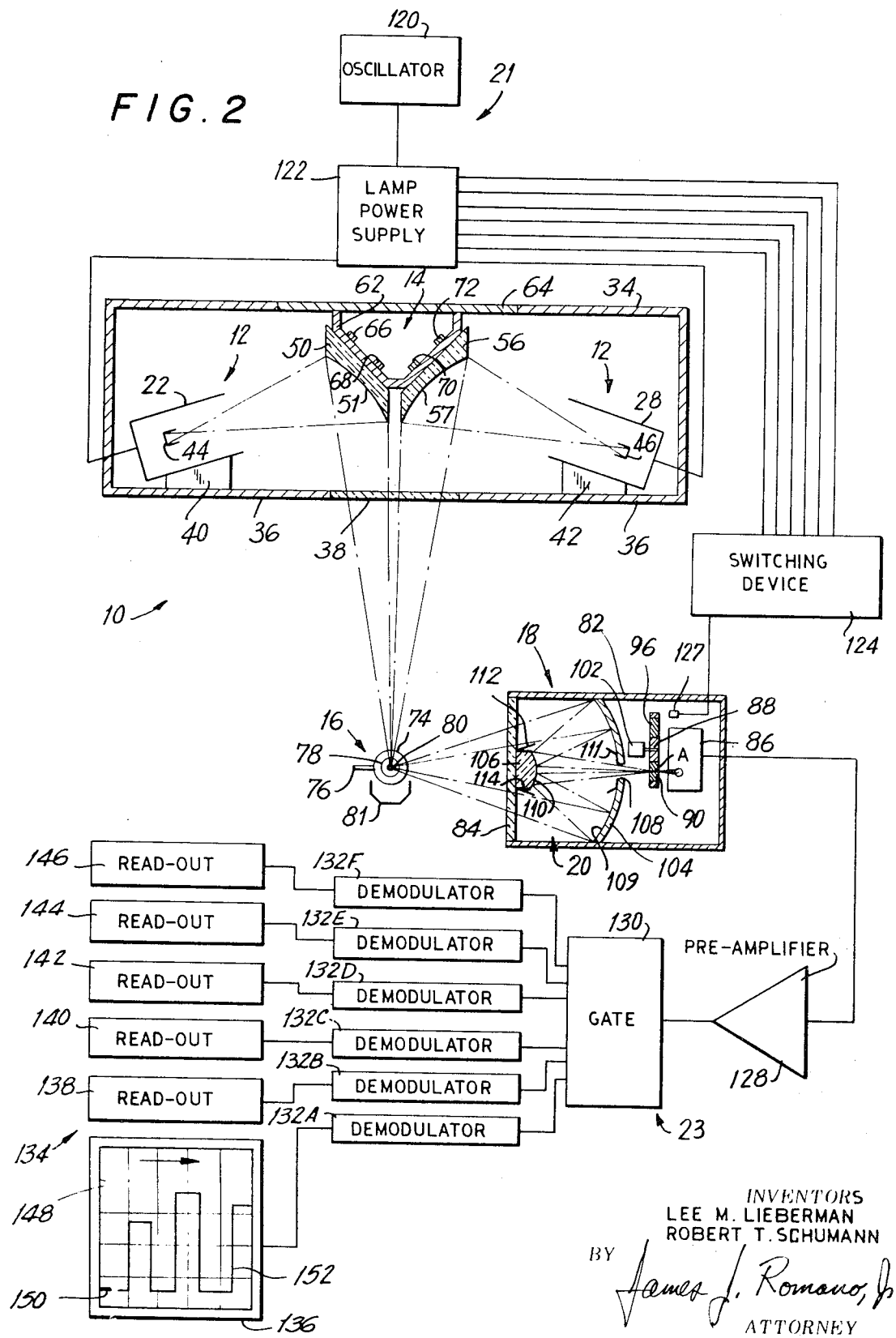

OPTICAL SYSTEM FOR USE IN AUTOMATIC, SIMULTANEOUS MULTIELEMENT ATOMIC SPECTROSCOPY SAMPLE ANALYSIS APPARATUS

As disclosed, said toroidal mirrors are disposed in a generally circular array thereof on generally frusto-conical toroidal mirror mounting means and are each effective to focus the radiation from a different one of said radiation sources at said sample burner flame volume; while said primary and secondary mirrors of said detector means optics are respectively constituted by a spherical concave mirror and a spherical convex mirror with the former having a generally central aperture extending therethrough and being operative to reflect the radiation from said irradiated burner flame volume for focusing on said secondary mirror, and the latter being operative to reflect said radiation through said primary mirror aperture for focusing substantially on the radiation detector.

Among the more significant advantages provided by the new and improved optical system of the invention are total insensitivity to shift in wavelengths of the radiation to be transmitted thereby, substantially complete isolation of the detector means from the radiation sources, and very significant reduction in the cost and overall size of the optical system.

BACKGROUND OF THE INVENTION

1. Field of the Invention

This invention relates to a new and improved optical system which is particularly designed for use in automatic, simultaneous multielement atomic spectroscopy sample analysis apparatus.

2. Description of the Prior Art

Although optical systems for use in simultaneous, multielement atomic spectroscopy sample analysis apparatus are known, it may be understood that no prior art optical system is known which can provide for such simultaneous, multielement sample analysis in fully satisfactory manner.

More specifically, it may be understood that the vast majority, if not all, of the prior art optical systems which are designed for use in simultaneous, multielement atomic spectroscopy sample analysis apparatus which include a plurality of radiation sources in the nature of hollow cathode lamps, will be found to require pluralities of collimating lenses, each of which is, of course, subject to intolerable change in image position, and therefore of collimation, due to varying index of refraction with wavelengths, each time the hollow cathode lamp radiation source which is used with a said lens is changed. Too, for sample analysis by atomic fluorescence spectroscopy, it may be understood that precisely fabricated and therefore very expensive quartz lenses are required to furnish the requisite high transmission in the ultraviolet range, whereby the overall cost of the prior art optical systems under discussion becomes unduly high. Further, in many prior art optical systems which utilize lenses as described, an additional optical element in the nature, for example, of a large parabolic mirror is required to thus further increase the overall cost and complexity of the optical system. In addition, it will be clearly understood by those skilled in this art that any optical system which must focus, for example, the radiation from a large plurality of radiation sources at a sample burner flame, and which utilizes lenses to accomplish this essential focusing function will, of necessity, present inordinately high space requirements. Further, any prior art optical system of the nature under discussion which utilizes lenses will, of course, embody substantial magnification of the hollow cathode lamp radiation source to thus introduce the requirements for excessively large, and unduly expensive, narrow bandpass filters for the detector optics. Also, it may be understood to be inordinately difficult in optical systems which utilize lenses for radiation focusing to completely isolate the radiation detector means from the hollow cathode lamp radiation sources, to thus give rise to the most undesirable possibility of radiation from said hollow cathode lamp radiation sources impinging directly upon said radiation detector means with resultant confusion by the latter of said direct radiation with the flame radiation of interest and rendering of the output signal of said radiation detector means substantially useless.

The above-described disadvantages of an optical system which utilizes lenses to constitute the requisite radiation source optics are believed applicable, if only to a somewhat lesser degree, to any radiation detector means comprising lenses which form the detector means optics. More specifically, it may again be understood that the shift in image position as will occur with lenses upon change in the wavelengths of the radiation to be transmitted and focused thereby will, of course, render extremely difficult the proper focusing of radiation of widely varying wavelengths substantially at the radiation detector. Too, the use of lenses in the detector means optics will, of necessity, render extremely difficult, if not impossible the use of baffles and the like to substantially eliminate the possibility of scattered radiation impinging directly upon the detector means. Also, it is believed clear that the use of lenses in the detector means optics of a simultaneous, multielement atomic spectroscopy sample analysis apparatus will, of necessity, significantly increase the space requirements of the overall apparatus detector means.

OBJECTS OF THE INVENTION

It is, accordingly, an object of this invention to provide a new and improved optical system for use in automatic, simultaneous multielement atomic spectroscopy analysis apparatus.

Another object of this invention is the provision of an optical system as above which is substantially independent of changes in the wavelengths of the plurality of radiation energies which are to be transmitted and focused thereby.

Another object of this invention is the provision of an optical system as above which is of significantly reduced cost when compared to the optical systems of similar function of the prior art.

Another object of this invention is the provision of an optical system as above which is of significantly reduced space requirements when compared to the functionally similar optical systems of the prior art.

Another object of this invention is the provision of an optical system as above which enables the totally remote disposition of the radiation source means from the radiation detector means to thus render substantially impossible the direct impingement upon the latter of the radiation from the former.

Another object of this invention is the provision of an optical system as above which provides for excellent accessability of the respective radiation source means and the radiation source optics.

Another object of this invention is the provision of an optical system as above which embodies an inherent aspect of significant versatility to thereby enable the ready and convenient modification thereof for use in atomic spectroscopy sample analysis applications of widely varying optical requirements.

Another object of this invention is the provision of an optical system as above which requires the use of only readily available components of proven dependability in the fabrication thereof to thus provide for long periods of satisfactory, maintenance free system operation.

A further object of this invention is the provision of an optical system as above which operates to provide for a very high level of the radiation energy of interest at the radiation detector to thus provide for significant increase in the sensitivity and accuracy of the atomic spectroscopy analysis apparatus of which the same forms a part.

A still further object of this invention is the provision of an optical system as above which is particularly adapted for use in automatic, simultaneous multielement atomic spectroscopy sample analysis apparatus which constitute a plurality of channels of automatic, blood sample treatment, supply and analysis means of the nature shown and described in U.S. Pats. Nos. 3,134,263 and 3,241,432.

SUMMARY OF THE INVENTION

As disclosed herein, the new and improved optical system of the invention is applied by way of example to automatic, simultaneous multielement atomic spectroscopy sample analysis apparatus which comprise six hollow cathode lamp radiation sources which are respectively effective to emit radiation of different wavelengths for the irradiation of a sample burner flame for the analysis by atomic fluorescence spectroscopy of a sample with regard to six different elements thereof, detector means including a radiation detector which is effective to generate an electrical output signal in accordance with the respective intensities of the radiation received thereby from said irradiated sample burner flame portion, and sample analysis results read-out means which are operative in response to the application of said electrical output signals thereto to provide permanent and readily reproducible records of the results of said sample analyses.

The new and improved optical system of the invention comprises radiation source optics which include six toroidal mirrors disposed in a generally circular array thereof around a generally frusto-conical toroidal mirror mounting member in the radiation source housing. Each of said toroidal mirrors is disposed in substantial optical alignment with a different one of said hollow cathode lamp radiation sources and is effective to reflect the radiation therefrom through an angle of approximately 90° and sharply focus said radiation at a concentrated sample volume or atom cloud of the sample burner flame for irradiation of the latter.

The new and improved optical system of the invention further comprises detector means optics which are supported in the remotely disposed detector means housing and comprise spaced primary and secondary mirrors. The primary mirror is constituted by a spherical concave mirror, while the secondary mirror is constituted by a spherical convex mirror. The primary mirror comprises a generally central aperture extending therethrough, and the secondary mirror is disposed in substantial alignment with said aperture. The primary mirror is effective to observe the irradiated sample volume of the burner flame and reflect the radiation of interest therefrom for focusing substantially at the surface of said secondary mirror. The secondary mirror is in turn effective to reflect the radiation transmitted thereto from said primary mirror through the generally central aperture in the latter for focusing substantially at the sample analysis apparatus radiation detector. The reverse side of the reflective surface of the secondary mirror may be understood to be effective to prevent the direct impingement of radiation from the sample burner flame upon the radiation detector, while baffle means are operatively associated with each of said primary and secondary mirrors to substantially prevent the impingement of light which may be scattered within said detector means housing upon said radiation detector.

DESCRIPTION OF THE DRAWINGS

The above and other objects and advantages of this invention are believed made clear by the following detailed description thereof taken in conjunction with the accompanying drawings wherein:

FIG. 2 is a generally schematic top view with parts in cross-section of the radiation source and detector means optics of the new and improved optical system of the invention;

DETAILED DESCRIPTION OF THE INVENTION

Figure 1:
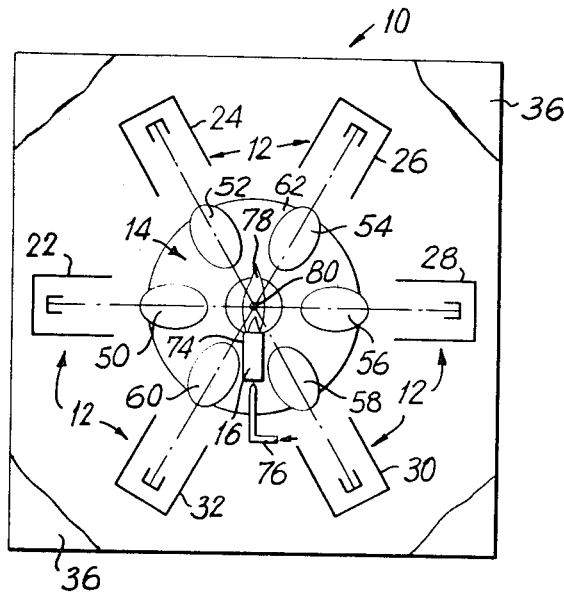
FIG. 1 is a generally schematic side view with parts in cross-section of the radiation source optics of a new and improved optical system constructed and operative in accordance with the teachings of this invention.

Referring now to the drawings, apparatus for automatic, simultaneous multielement sample analysis by atomic spectroscopy are indicated generally at 10, and comprise radiation source means as indicated generally at 12, radiation source means optics as indicated generally at 14 and which are constructed and operative in accordance with the teachings of this invention, sample burner means as indicated generally at 16, detector means as indicated generally at 18, and detector means optics as indicated generally at 20, which are constructed and operative in accordance with the teachings of this invention, respectively. Radiation source control and modulation means are indicated schematically at 21; while output signal demodulation, processing read-out means are indicated schematically at 23.

For use, for example, in the simultaneous multielement analysis by atomic fluorescence spectroscopy of a sample with regard to six distinct elements thereof, it may be understood that the radiation source means 12 will comprise a generally circular array of fixed hollow cathode lamp fluorescent radiation sources as indicated at 22, 24, 26, 28, 30 and 32, and respectively arranged at substantially 60° intervals in the manner made clear by FIG. 1. The said hollow cathode lamps are disposed as shown in a housing 34 which comprises a support wall 36 of any suitably heat insulative material having a window 38 of any suitably transparent material in the nature of fused silica disposed therein as shown. Preferably the fused silica window 38 is anti-reflection coated with a suitable material in the nature of magnesium fluoride $MgF_2$ to substantially eliminate the 4 percent radiation reflection otherwise encountered at an uncoated glass-air interface, and to minimize radiation scattering.

Hollow cathode lamp mounting means as indicated at 40 and 42 in FIG. 2 for the respective hollow cathode lamps 22 and 28 are provided to extend as shown from the housing support wall 36 to support the said hollow cathode lamps therefrom in substantially fixed position. Non-illustrated lamp adjustment means may, of course, be provided in said lamp mounting means to enable the precise positional adjustment of the respective hollow cathode lamps for purposes made clearer hereinbelow. Preferably, the respective inner surfaces of the walls of housing 34 are each coated with a suitable anti-reflection material in the nature of velvet or suede paint to thus minimize the reflection thereby of any radiation which is scattered within the housing 34.

Each of said hollow cathode lamps comprises a cathode or cavity, as indicated at 44 and 46 for hollow cathode lamps 22 and 28 in FIG. 2, and may be understood to be effective to provide radiation consisting of a series of discrete spectral emission lines which are characteristic, in each instance, of the particular sample element of interest. Each of said cathodes or cavities may be understood to provide an object which is reimaged at the center of the sample burner flame as described in detail hereinbelow. For generally conventional sample analysis, it may be understood that most of said spectral emission lines will lie in the 2,000–3,000 angstrom spectral region.

Referring now to the radiation source means optics 14, the same may be seen to comprise six toroidal mirrors as indicated at 50, 52, 54, 56, 58 and 60, which are respectively arranged in a generally circular array thereof as shown, again at substantially 60° intervals. Each of said toroidal mirrors is, of course, disposed as shown in substantial optical alignment with a different one of said hollow cathode lamps in the manner described in detail hereinbelow. The respective reflective surfaces of the toroidal mirrors as indicated for example at 51 and 57 for toroidal mirrors 50 and 56 in FIG. 2 are preferably coated with a thick aluminum film, the direct reflectance of which is as high as possible. This aluminum film is subsequently preferably over-coated with a magnesium fluoride layer to protect the same and further enhance the reflectance thereof.

In use, each of the toroidal mirrors acts in the manner of a simple lens, it being understood that a toroid is an approximation of an ellipsoid of revolution about the major axis. This is to say that the same may be visualized as a section from the outer edge of a doughnut. A toroid has two curvatures at right angles to one another, the radii of which correspond to the osculating spheres at the vertex of an equivalent ellipsoid. The toroidal mirrors comprise surfaces of circular cross-section which may be understood to be far more easily and inexpensively fabricated than the generally aspheric surfaces found, for example, in an off-axis ellipsoid.

The respective toroidal mirrors 50, 52, 54, 56, 58 and 60 are supported as shown from a generally frusto-conically shaped mirror-mounting member 62 which is in turn supported as shown from a readily removable housing hatch or wall portion 64 to enable the ready and convenient removal of the radiation source means optics 14 as a whole from the housing 34 as should be obvious. Adjustment screws as indicated in FIG. 2 at 66 and 68 for toroidal mirror 50, and at 70 and 72 for toroidal mirror 56 are provided to respectively extend as shown through the relevant portion of the toroidal mirror-mounting member 62 to enable precise adjustment of the respective toroidal mirror dispositions thereon as should be obvious.

Each of the toroidal mirrors 50, 52, 54, 56, 58 and 60 is disposed in optical alignment with a different one of the hollow cathode lamps to form a hollow cathode lamp-toroidal mirror pair therewith. This is to say that each of said hollow cathode lamp-toroidal mirror pairs as, for example, those constituted by hollow cathode lamp 22 and toroidal mirror 50, or hollow cathode lamp 28 and toroidal mirror 56, is respectively supported and disposed in such manner within the housing 34 so that the radiation energy from the hollow cathode lamp of a said pair impinges as shown substantially only upon the toroidal mirror of the same said hollow cathode lamp-toroidal mirror pair and is deflected thereby as shown through an angle of substantially 90° for purposes described in detail hereinbelow.

Referring now to the sample burner means 16, the same may, for example, take the form of those illustrated and described in the co-pending application of Douglas G. Mitchell Ser. No. 71,774, filed Sept. 14, 1970, and assigned to the assignee hereof. More specifically, and although said sample burner means do not, per se, constitute a part of this invention, it may be understood that the same comprise a burner body 74 having a non-illustrated generally centrally disposed sample drop passage extending therethrough. Drop generator means as indicated at 76 are disposed as shown adjacent the lower end of said burner body in substantial alignment with said sample drop passage and are operative in the manner believed well known by those skilled in this art to generate a stream of substantially uniformly sized and spaced sample drops for upward travel through said burner body passage into the burner frame 78 to result in the partial conversion of the sample element molecules to atoms and the formation of a concentrated atom cloud or sample volume 80 in said burner frame to significant advantage for sample analysis by atomic spectroscopy. Laminar flow of the gas and air in the burner flame center and in the space between the burner flame and the detector means will, of course, assure that the position of the atom cloud 80 within said burner flame remains fixed.

Other forms of sample burner means may, of course, be utilized in the apparatus of the invention although it is believed that the numerous and significant advantages of sample burner means constructed and operative as described in detail in said co-pending application for U.S. Patent would make the use thereof preferable.

Light trap means are indicated schematically at 81 and may be understood to be operatively associated with the sample burner means 16 in such manner that the radiation energies from the respective hollow cathod lamps which pass through the burner flame 78 will be substantially absorbed thereby. More specifically, and since the substantial exclusion of direct, or reflected or scattered, hollow cathode lamp radiation energy from the field of view of the detector means 18 is of primary importance here, it may be understood that said light trap means prevent the simple scattering of said radiation energy subsequent to said flame-passage by insuring that substantially all of such direct radiation energy undergoes at least four reflections from highly radiation-energy-absorbent surfaces of 98 percent minimum absorption, thus reducing the intensity thereof to no greater than 0.00016 of the direct radiation intensity.

Referring now to the detector means 18, the same may be seen to comprise a housing 82 having a transparent front wall 84 which may again be formed from fused silica coated as described hereinabove with MgF2 to substantially eliminate radiation reflection. A radiation detector is indicated schematically at 86 and may, for example, take the form of a shielded, highly sensitive photocell or photomultiplier tube depending upon the nature of the sample analyses to be performed by the apparatus of the invention.

Figure 3:
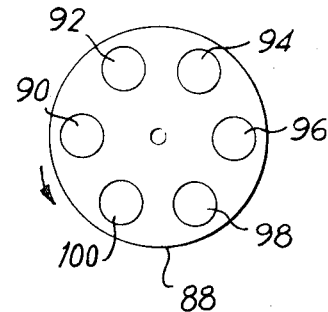
FIG. 3 is a front view of the filter wheel of FIG. 2.

A filter wheel is indicated at 88 and, for use in conjunction with apparatus having six hollow cathode lamps and six operatively associated toroidal mirrors, may be understood to comprise six filters disposed thereon again at substantially 60° intervals as indicated at 90, 92, 94, 96, 98 and 100 in FIG. 3. Each of said filters is preferably constituted by a narrow bandpass dielectric filter having a bandpass wavelength which is, of course, appropriate to spectroscopic sample analysis with regard to different sample elements of interest. A filter wheel drive motor is indicated at 102 and is, of course, effective to rotate the filter wheel 88 at constant speed to sequentially operatively position the respective filter wheel filters relative to the radiation detector 86, all as described in greater detail hereinbelow.

Referring now to the detector means optics 20, the same may be seen to comprise a concave spherical primary mirror 104 which is supported as shown from the detector means housing 82, and a convex spherical secondary mirror 106 which is supported as shown from the transparent housing wall 84 generally centrally of the latter. A central aperture 108 extends as shown through the concave spherical primary mirror 104.

The reflective surface 109 of the primary mirror 104 and the reflective surface 110 of the secondary mirror 106 are again each preferably aluminum film coated and magnesium fluoride film over-coated in the manner of the toroidal mirrors as described hereinabove. The reverse side of the reflective surface 110 of the secondary mirror 106 is, of course, effective in the manner of a field stop to prevent the passage of radiation energy from the burner flame 78 therethrough to the aperture 108 of the primary mirror 104.

A generally frusto-conical knife edged baffle 111 is operatively disposed as shown around the aperture 108 in the primary mirror 104 in alignment therewith to prevent the passage of light, other than which is reflected from the secondary mirror 110 as described in detail hereinabove, through said mirror aperture for subsequent passage through a filter for impingement upon the radiation detector 86. In like manner, a ring baffle 112 is operatively associated as shown with the secondary mirror 106 to substantially surround the same and prevent the impingement of light upon the reflective surface 110 of said secondary mirror other than as is reflected thereto as described in detail hereinbelow from the reflective surface of the primary mirror 104. A coating 114 of any suitably opaque material is applied as shown around the cylindrical portion of the periphery of the secondary mirror 106 to prevent the passage of light through said secondary mirror peripheral portion.

From the above is believed made clear that the detector means optics 20 are basically of inverse cassegrainian or Inca form, the primary function of which is, of course, to substantially focus or image the radiation energy from the observed portion of the concentrated sample volume or atom cloud 80 of the burner flame 78 substantially at a small region A on the narrow bandpass filter which is then operatively disposed as described relative to the radiation detector 86. A particularly informative analysis of the theoretical justification for the use of an Inca type system is believed provided by Dr. Seymour Rosin's article in Applied Optics of Aug. 1968, Vol. 7, No. 8.

For use, for example, as described in detail hereinbelow in the simultaneous multielement analysis of a plurality of blood samples, it may be understood that the detector means optics 20 may be used at a finite conjugate where the magnification is approximately 2.7 and for which spherical aberration, coma, and astigmatism of the third order are corrected. Said optics may, for example, be used at N.A. = 0.5 (F/1.0) and the speed thereof may be increased if additional radiation energy is required for satisfactory operation of the radiation detector 86. In this regard, it may be understood that the fused silica window 84 from which the secondary mirror 106 is supported, has essentially no effect on the optical properties of the detector means optics 20 but rather, functions to isolate the latter from dust and corrosive gases and the like in the area of the burner flame 78. The central obscuration of the detector means optics 20 will be approximately 18 percent, and this may be readily understood by those skilled in this art to be very reasonable for an F/1.0 optical system.

Referring again to the radiation source optics 14, it is, of course, the function of each of the toroidal mirrors 50, 52, 54, 56, 58 and 60 to transport the energy from the hollow cathode lamp with which the same is operatively associated as described, for focusing substantially at the concentrated sample volume or atom cloud 80 of the burner flame 78, whereby is believed made clear that said radiation source optics 14 will function substantially in the manner of condenser optics. Since the respective toroidal mirrors are not required to preserve precise positional (image) information, it may be understood that the same may have residual aberrations just as long as a considerable portion of the hollow cathode lamp radiation energy from each of the hollow cathode lamps is transported as described substantially to said concentrated sample volume or atom cloud of the burner flame for irradiation of the former. Preferably, and for use with a burner flame 78 having a concentrated sample volume or atom cloud of, for example, approximately 8mm width, it may be understood that the respective hollow cathode lamps, toroidal mirrors and sample burner would be arranged to enable the irradiation by the hollow cathode lamp radiation energies of the approximately central 4mm of said burner flame sample volume or atom cloud.

In like manner, it is, of course, the function of the detector means optics 20 to observe substantially only the irradiated portion of the concentrated sample volume or atom cloud 80 at the center of the burner flame 78, and to collect the radiation of interest therefrom and optically direct the same through the relevant narrow bandpass dielectric filter to the detector 86 and, in this latter regard, the said detector means optics may be understood to have proven effective to provide a 0.001 inch spot size at the radiation detector 86 over the entire field of view for an F/1.0 optical system. This is excellent image quality as will be readily apparent to those skilled in this art, although it is believed that further increase in the speed of the detector means optics 20 may be accomplished through the application of sophisticated techniques in the nature of ray tracing thereto. As disclosed, the detector means optics 20 collect a substantial portion of the radiation in the field of view thereof at the concentrated atom cloud or sample volume 80 in the burner flame 78, and this may be understood to be substantially determined by the size of the respective narrow bandpass dielectric filters 90 through 100.

For use, for example, to constitute six channels of automatic blood sample supply treatment and analysis means of the disclosed in U.S. Pats. Nos. 3,241,432 and 3,134,263, it may be understood that a stream of a series of suitably treated blood samples would be supplied to the sample burner means 16 through the drop generator means 76 for supply as described to the sample burner flame 78 and resultant partial conversion thereof to atoms to form the concentrated atom cloud or sample volume 80. If it is assumed that each of said blood samples is to be simultaneously analyzed by atomic fluorescence spectroscopy with regard to six distinct blood sample elements, it may be understood that each of the hollow cathode lamps would be configured to emit radiation at a wavelength appropriate to such analysis for a different one of said elements. In addition, each of the narrow bandpass dielectric filters on the filter wheel 88 would, of course, be configured to have a bandpass appropriate to the passage of atomic fluorescence radiation therethrough of a wavelength appropriate to a different one of said blood sample elements.

Referring now to the radiation source control and modulation means 20 which do not, per se, constitute a part of this invention, the same may, for example, take the general form of those shown and described in the copending application for U.S. Pat. of Douglas Mitchell, Ser. No. 827,554, filed May 26, 1969, and assigned to the assignee hereof and, as such, would comprise operatively connected oscillator, lamp power supply and switching means as schematically indicated at 120, 122 and 124. Each of the hollow cathode lamps would, of course, be operatively connected for energization to said lamp power supply means 122 as indicated for hollow cathode lamps 22 and 28, only, in FIG. 2.

Angular position sensing means as indicated schematically at 127 would be operative associated as shown with the rotating filter wheel 88 within the detector means housing 82 and would be operatively connected as indicated to the switching means 124 to operate the latter in accordance with the angular position at any point in time of said rotating filter wheel.

Referring now to the output signal demodulation, processing and read-out means 23 which again do not, per se, constitute a part of this invention, the same may again take the general form of those shown and described in said copending Mitchell application, and, as such, would comprise operatively connected preamplifier, gate and demodulator means as schematically indicated at 128, 130 and 132A through 132F, respectively. Read-out means are indicated generally at 134 and, for such six channel use, might comprise six individual read-out devices as schematically indicated at 136, 138, 140, 142, 144 and 146, respectively. Each of said read-out devices may, for example, take the form of a DC null-balance type strip chart recorder as illustrated specifically for read-out device 136, only, and, as such, would comprise a driven recorder strip chart 148 and a recorder pen or stylus 150 which is operable, in the manner known to be well understood by those skilled in this art, to trace a graph 152 of the blood sample analysis results of the relevant analysis channel on said recorder strip chart. The construction and manner of operation of strip chart recorders of this type are shown and described in detail in said U.S. Pat. No. 3,241,432.

OPERATION

In operation, as the relevant molecules of each blood sample are partially converted as described to atoms to form the concentrated atom cloud or sample volume 80 in the burner flame 78, it may be understood that the sequential energization of the respective hollow cathode lamps and attendant rotation at constant speed of the filter wheel 88 would be effective to accomplish the simultaneous, multielement atom fluorescence spectroscopic analysis of said blood sample for said six distinct blood sample elements. More specifically, and referring now in addition to the lamp energization timing diagram of FIG. 4, it may be understood that as filter wheel 88 were rotated into the position thereof to operatively dispose filter 90 relative to the radiation detector 86, this would be sensed by the angular position indicator 127 and the switching device 124 operated thereby to effect the energization by pulsing of the hollow cathode lamp 22 from the power supply means 122 as modulated at, for example, 1,000 CPS by the square wave output from oscillator 120, for the period of time commensurate with the duration of the operative disposition of filter 90 relative to said radiation detector. As a result, the radiation energy from hollow cathode lamp 22 would impinge upon and be reflected from the toroidal mirror 50 for focusing substantially at the concentrated sample volume or atom cloud 78 to irradiate the latter. This will result in radiation being given off by the atoms of blood sample element 1 as said atoms re-radiate isotropically, or equally in all directions, and the relevant portion of this fluorescent radiation which is directed as shown at the fused silica window 84 of the detector means 18 will pass therethrough as shown for impingement upon and reflection from the reflective surface 108 of primary mirror 104 with resultant focusing thereof as shown substantially upon the reflective surface 110 of the secondary mirror 106. This fluorescent radiation of interest will be reflected as shown from said secondary mirror reflective surface for focusing as a spot substantially at region A on narrow bandpass dielectric filter 90 and passage therethrough of substantially only the radiation of the wavelength of interest to the radiation detector 86.

The resultant electrical output signal from said radiation detector — the amplitude of which will, of course, be proportional to the intensity of said fluorescent radiation of interest—will be applied as indicated to the preamplifier means 128 for obvious purpose, whereupon the thusly amplified signal will be applied to the gate means 130. Concomitantly, said gate means 130 will, of course, have been signaled by the switching device 124 under the control of the angular position indicator 127 to apply the signal under discussion to the appropriate demodulator 132A wherein the same will be demodulated and applied as indicated to the strip chart recorder read-out means 136 to operate the DC null-balance circuit thereof and commence the movement of the recorder pen or stylus 150 to the position thereof commensurate with the level of the fluorescent radiation of interest for blood sample element 1.

At the expiration of the period of time during which the filter 90 is operatively disposed as described relative to the radiation detector 86, it may be understood that the angular position indicator 127 will operate the switching device 124 to de-energize hollow cathode lamp 22 and energize hollow cathode lamp 24 by the pulsing of the latter for a period of time commensurate with the operative disposition of the succeeding narrow bandpass filter 92 relative to the radiation detector 86. This will, of course, result in the irradiation of the sample volume or atom cloud 80 with radiation energy from hollow cathode lamp 24 which is appropriate to the fluorescent radiation within said atom cloud from the atoms of blood sample element 2 of interest. This radiation will be focused as described substantially at said filter 92 for passage therethrough and detection by the radiation detector 86. Concomitantly, the switching device 124 will, of course, have operated the gate means 130 to effect the application of the resultant output signal from the radiation detector 86 for sample element 2 of interest to the demodulator means 132B, whereupon said signal will be demodulated as described and applied as indicated to the strip chart recorder read-out means 144 for commencement of operation of the latter.

Operation would, of course, be continuous in manner described with the respective hollow cathode lamp 22, 24, 26, 28, 30 and 32 being sequentially energized by pulsing through continuous cycles of operation thereof in synchronism with the respective operative disposition of the narrow bandpass filters 90, 92, 94, 96, 98 and 100 relative to the radiation detector 86 until such time as a sufficient number of such hollow cathode lamp energization cycles have been effected to accomplish satisfactory, simultaneous multielement analysis of the blood sample of interest with regard to said six distinct elements thereof. This is to say that since the fluorescent radiation of interest for each of the six blood sample elements is of relatively low intensity, it will probably be necessary that a large plurality of the described hollow cathode lamp energization cycles be effected for each blood sample in order to provide for satisfactory strip chart recorder operation.

Following this, it may be understood that the succeeding blood sample in said series stream thereof would be supplied in turn to the drop generator means 76 again for simultaneous multielement analysis thereof by atomic fluorescence spectroscopy with regard to the same six distinct blood sample elements.

Figure 4:
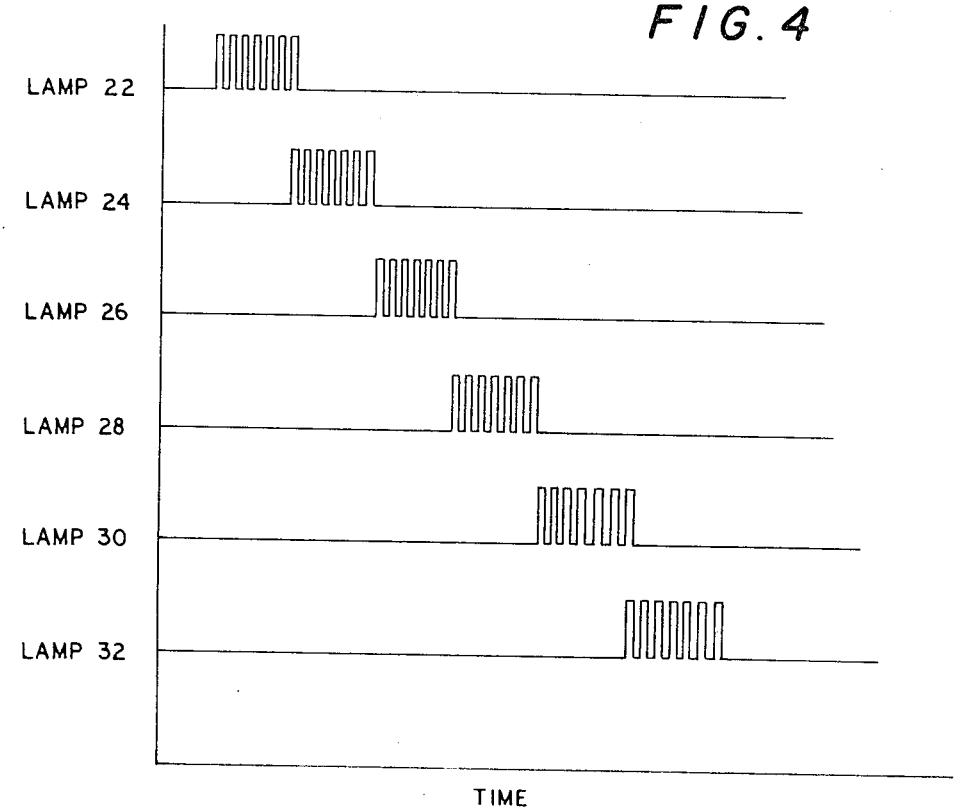
FIG. 4 is a timing diagram for one cycle of radiation source pulse energization.

Simultaneous multielement analysis of a blood sample by atomic emission spectroscopy and atomic fluorescence spectroscopy by the apparatus of the invention may readily be effected through the simple disconnection of one or more of the respective hollow cathode lamps. More specifically, and assuming it is desired to effect the simultaneous multielement analysis of a blood sample with regard to the respective calcium, iron and iodine constituents thereof by atomic fluorescence spectroscopy, and the respective sodium, potasium and lithium constituents thereof by atomic emission spectroscopy, it may be understood that, for example, hollow cathode lamps 28, 30 and 32 might simply be disconnected from the lamp power supply means 122 while, for example, demodulator means 132D, 132E and 132F would be disconnected from the gating means 130 and provision made to apply the relevant radiation detector means output signals directly to the strip chart recorder read-out means 142, 144 and 146, respectively. As a result, and with hollow cathode lamps 22, 24 and 26 being sequentially energized and operated as described to effect blood sample analysis by atomic fluorescence spectroscopy for calcium, iron and iodine, the lack of energization of hollow cathode lamps 28, 30 and 32 during the remaining time periods of each lamp energization cycle as depicted in FIG. 4 would, of course, make possible the analysis by atomic emission spectroscopy of the same blood sample with regard to the respective sodium, potasium and lithium constituents thereof. Despite the fact, however, that during such remaining time periods of each lamp energization cycle the respective hollow cathode lamps 28, 30 ane 32 would not be energized, it is believed clear that the rotation of the filter wheel 88 and the operation of the gating means 130 through angular position indicator 127 and switching device 124 would remain effective to insure detection of substantially only the atomic emission radiation of interest by the radiation detector 86 and appropriate switching action by said gating means to effectively apply the resultant output signals directly to the appropriate strip chart recorder read-out means 142, 144 and 146 to actuate the same as described.

A particularly significant advantage of the use of toroidal mirrors as opposed, for example, to the more common use of lenses in the radiation source optics 14, resides in the fact that said toroidal mirrors are totally unaffected by shifts in the wavelength or color of the radiation to be reflected and focused thereby. This may readily be contrasted with a lens system wherein the shift in image position as formed by the lens would render the same substantially unsatisfactory for use in a system wherein radiation of wide varying wavelengths must be effectively reflected and focused. In addition, the disposition and use as described of the respective toroidal mirrors operates to substantially minimize the packaging space required therefor to thus significantly reduce the requisite size of the housing 34 and enhance the manufacturability of the radiation source and radiation source optics package.

A further advantage of the use of toroidal mirrors, as opposed to lenses, is the fact that the former effectively reflect and focus radiation at the same time. Too, it is believed well understood by those skilled in this art that toroidal mirrors of the nature under discussion, which are but combinations of substantially circular cross-sections as described, may be much more economically fabricated than lenses of commensurate optical capability. Also, it is believed clear that the alignment of the respective toroidal mirrors may be readily and precisely achieved through simple observation of the form of the radiation image produced thereby. In addition, an advantageous aspect of significant versatility is provided by the use of toroidal mirrors in that the respective orientations or angles thereof relative to the hollow cathode lamp and the concentrated atom cloud or sample volume of the burner flame can be varied through relatively wide ranges in accordance with varying optical system requirements. Too, the respective radiation source 12 and radiation source optics 14 may, of course, be readily modified to accomodate more or less sample analysis channels.

It is believed clear that the described arrangements of the respective hollow cathode lamp and the respective toroidal mirrors within the housing 34 enable the absolutely remote disposition thereof from the detector means 18 to thus eliminate the possibility of radiation energy from said hollow cathode lamp impinging directly upon said detector means with attendant loss of meaningful detector means output signals as should be obvious. Too, the described hollow cathode lamp and toroidal mirror arrangement clearly provides for excellent accessability to all of the same as should be obvious. Also, said toroidal mirrors will, of course, have a substantially higher reflectance than would lenses in the ultraviolet radiation transmission range, unless such lenses are made of expensive crystal optics. In addition, the substantially 90° arc through which the radiation from the respective hollow cathode lamps is turned by the respective toroidal mirrors enables a much more compact radiation source and radiation source optics arrangement than would the use of lenses, and furnishes the additional advantage that the necessity for an extra optical element, as would appear in typical equivalent lens arrangements, is eliminated.

The overall cost of the toroidal mirrors, in the event that the same are ground and polished to provide the requisite smooth mirror surface, will be but 70 percent or less than the cost of the equivalent lenses, while the cost of such toroidal mirrors as pressed and "fire-polished" will be but 30 percent of the cost of said equivalent lenses.

A particularly significant advantage of the use of detector means optics 20 which, as disclosed herein, take the basic form of an Inca system, resides in the fact that the same renders substantially impossible the impingement of any direct rays from the burner flame upon the radiation detector 86, and this may be understood to be effectively accomplished with very little loss in radiation energy. This is to say that said detector means optics are believed to offer maximum isolation of the detector means from direct burner flame radiation with maximum radiation collection from the burner flame sample volume or atom cloud 80. Those skilled in this art will readily appreciate that no single mirror system could provide these most significant advantages and exhibit the same S/No as does the said Inca system. A further advantage is the fact that the spherical primary and secondary mirrors 104 and 106 may be readily fabricated to high quality specifications.

The modulation as described of the respective hollow cathode lamp energizations, and the demodulation as described of the resultantly modulated electrical output signals from the radiation detector will function, in the manner believed well understood by those skilled in this art to materially decrease the effects of burner flame noise and sample drop radiation scattering and the like, and to accordingly provide very substantial increase in the overall output signal-noise ratio with attendant very substantial increase in apparatus accuracy and sensitivity. Other and different modulation and demodulation techniques may, of course, be employed in the nature, for example, of the sample burner flame modulation techniques as illustrated and described in detail in said copending Mitchell application, Ser. No. 827,554, or no modulation technique need be applied.

Although disclosed hereinabove by way of example as including six toroidal mirrors for use with a radiation source comprising six hollow cathode lamps, it is believed clear that the new and improved optical system of the invention may include a lesser or greater number of said toroidal mirrors for use with a radiation source having a lesser or greater number of said hollow cathode lamps.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principle of this invention within the scope of the appended claims.

What is claimed is

1. In an optical system for use in atomic spectroscopy sample analysis apparatus including a plurality of radiation sources which are effective to emit radiation of different wavelengths for the irradiation of a sample flame, the improvements comprising, first optic means comprising a plurality of toroidal mirror means for reflecting the radiation from said plurality of radiation sources and focusing said radiation substantially at the same volume of said sample flame to irradiate the latter, each of said mirror means being in substantial optical alignment with a corresponding one of said radiation sources and arranged relative thereto so that substantially all of the radiation from each of said radiation sources will impinge on said corresponding one of said mirror means for reflection and focusing thereby at said sample flame volume.

2. In an optical system as in claim 1 wherein, each of said mirrors is arranged to reflect the radiation from the corresponding radiation source through an angle of approximately 90° for focusing substantially at said sample flame volume.

3. In an optical system as in claim 1 wherein, said plurality of radiation sources are arranged in a generally circular array thereof, and said plurality of mirror means are arranged in a generally circular array thereof which is disposed generally centrally of said generally circular radiation source array.

4. In an optical system as in claim 1 further comprising, mirror mounting means which take the form of a generally frusto-conical mirror mounting member, said mirrors being mounted at generally equally spaced intervals around the periphery of said mounting member.

5. In an optical system as in claim 1 wherein, said atomic spectroscopy sample analysis apparatus further comprise detector means including a radiation detector, the further improvements comprising, second optic means for observing substantially only said irradiated sample flame volume and focusing the radiation therefrom substantially on said radiation detector, said second optic means comprising spaced primary and secondary mirrors, said primary mirror comprising a concave spherical mirror having a generally centrally disposed aperture extending therethrough and said secondary mirror comprising a convex spherical mirror disposed in substantial alignment with said aperture, said primary mirror being effective to observe said irradiated flame volume and to reflect the radiation therefrom and focus the same substantially on the reflective surface of said secondary mirror, said secondary mirror being effective to reflect said radiation from said primary mirror and focus the same through said primary mirror aperture substantially on said radiation detector, said secondary mirror being disposed between said sample flame volume and said primary mirror to prevent the passage of radiation from said sample flame volume directly through said primary mirror aperture to said radiation detector.

* * * * *